United States Patent
Bhamidipaty et al.

(10) Patent No.: US 11,620,577 B2
(45) Date of Patent: Apr. 4, 2023

(54) MULTI-MODAL DATA EXPLAINER PIPELINE

(71) Applicant: International Business Machines Corporation, Armonk, NY (US)

(72) Inventors: Anuradha Bhamidipaty, Yorktown Heights, NY (US); Bhanukiran Vinzamuri, Elmsford, NY (US); Elham Khabiri, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 16/917,971

(22) Filed: Jul. 1, 2020

(65) Prior Publication Data
US 2022/0004429 A1    Jan. 6, 2022

(51) Int. Cl.
G06F 9/48    (2006.01)
G06N 20/00   (2019.01)
G06F 9/54    (2006.01)
G06F 18/24   (2023.01)
G06F 18/214  (2023.01)

(52) U.S. Cl.
CPC ........... *G06N 20/00* (2019.01); *G06F 9/4881* (2013.01); *G06F 9/544* (2013.01); *G06F 18/214* (2023.01); *G06F 18/24* (2023.01)

(58) Field of Classification Search
CPC ..... G06F 9/4881; G06F 9/544; G06K 9/6256; G06K 9/6267; G06N 20/00; G06N 5/003; G06N 5/025
See application file for complete search history.

(56) References Cited

U.S. PATENT DOCUMENTS 10,581,887 B1    3/2020    Dinerstein
10,810,187 B1 *  10/2020   Nolan ................. G06F 16/2379
(Continued)

FOREIGN PATENT DOCUMENTS

CN    107194260 A    9/2017
KR    20190036254 A  4/2019
WO    201988972 A1   5/2019

OTHER PUBLICATIONS

Ribeiro et al., ""Why Should I Trust You?" Explaining the Predictions of Any Classifier", © 2016 Copyright held by the owner/author(s), ISBN 978-1-4503-4232-2/16/08, 10 pages, <https://dl.acm.org/doi/10.1145/2939672.2939778>.

*Primary Examiner* — Michael A Keller
(74) *Attorney, Agent, or Firm* — Jordan A. Lewis; Jared L. Montanaro

(57) ABSTRACT

Embodiments of the present invention provide a computer system, a computer program product, and a method that comprises ingesting tabular data from at least one modality of a plurality of modalities; simultaneously extracting data and generating a prediction model for a task of a computing device from the extracted data from at least two modalities in the plurality of modalities; generating a data signature based on the generated prediction model from the at least two modalities by leveraging the generated prediction model for ingested tabular data and extracted data; comparing the generated data signature to identified data signatures stored in at least one modality in the plurality of modalities; and performing a task based on the generated data signature and a validation of the comparison of identified data signatures.

20 Claims, 15 Drawing Sheets

(56) References Cited

U.S. PATENT DOCUMENTS

| | | |
|---|---|---|
| 2014/0316959 A1* | 10/2014 | Bisceglia ........... G06Q 10/0635 |
| | | 705/35 |
| 2019/0132256 A1* | 5/2019 | Wada .................... G06F 9/5077 |
| 2019/0156196 A1 | 5/2019 | Zoldi |
| 2019/0279042 A1 | 9/2019 | Cataltepe |
| 2020/0022016 A1 | 1/2020 | Fenoglio |
| 2020/0074331 A1 | 3/2020 | Arendt |

* cited by examiner

422 get_component_pitags ( ["hydr"], prism_model_name=" ", logging=True, turbine_ query: match (s:SENSOR) <-[]- (pi : PI_TAG) where LOWER ( s.description ) contains LOWER ("hydr") and LOWER (pi.name) contains LOWER ("1c11") return distinct s.description, pi.name, pi:Description

| | | |
|---|---|---|
| : PRESS. | | Pressure |
| M : | Pos. | Position |
| M : | POS | Position |
| .. | Pos. | Position | get_tags (_model_name=, turbine_id=, logging=tru match (pi : PI_TAG) <-[]- (pr_MODEL) where LOWER (pr.name) contains LOW ER (" ") and pi.name contains return distinct pi.name, pi.D escription

| | Notifications | | WKS component | Expert component |
|---|---|---|---|---|
| alvola hc2va t | 4 02:06:41 luigi canes | iata a valle della valvola di spurgo hc2va posta sull' sh ammiss | ['spurghi', 'flangia', 'valvola'] | Turbine Drains |
| remitreccia i | 015 11:39:49 alberto t | erde dal premitreccia la valvola hc703b by-pass valv.di stop dx | ['premitreccia', 'valvola'] | Turbine Drains |
| tercettatice c | 4 11:48:28 alberto ba | valvola d'intercettazione dx perde dalla sede (non permettendo | ['valvola_di_stop', 'valvola'] | Turbine Intercept Valves |
| vlv tirbina2 | 13 marco anelli (a230 | ento odierno del gr2 non e' stato possible rullare la turbina per | ['valvola'] | Turbine Intercept Valves |
| la fx3418 x0 | 6:58 davide testa (a23 | al 25/01/2016 non si appriva la valvola di intercetto dx fx3418x0 | ['valvola'] | Turbine Intercept Valves |
| la fx3418 x0 | :09 daniele francesco | di intercetto dx fx3418x01 presenta un anomalia nella pagina | ['valvola'] | Turbine Intercept Valves |
| vole ingr h2 | 014 00:49:34 vanni fo | essia' do tenere caldo l'olio turbina1, sarebbe opportuno elimir | ['valvola'] | Turbine Lube Oil Coolers lube oil |
| efrigerante o | 016 13:18:13 almin m | valvola trevie utilizzata per selezionare il refrigerante olio turb | ['refrigerante_olio', 'valvola'] | Turbine Lube Oil Coolers lube oil |
| one turbina | 2014 11:08:25 davide | ubrificazione turbina: ventilatore estrazione vapori cassa olio ** | ['tubazione', 'cassa_olio'] | Turbine Lube Oil Filtration lube oil |
| turbina alto- | 41:52 davide testa (a2 | ro olio regolazione posto sul piede turbina gr2 (lato pc) | ['filtro_olio_regolazione'] | lube oil |
| ura drenaggic | 1 01:02:36 luigi canes | ando di apertura automatica della valvola fx92x (drenaggio rhf | ['tubazione', 'valvola'] | valve |

FIG. 4F

MULTI-MODAL DATA EXPLAINER PIPELINE

BACKGROUND

The present invention relates generally to the field of data prediction technology, and more specifically to data leveraged over multiple modalities.

Machine learning is the study of computer algorithms that improve automatically through experience. Machine learning algorithms build a mathematical model based on sample data, known as training data, in order to make predictions or decisions without being explicitly programmed to do so. Machine learning algorithms are used in a wide variety of applications, such as email filtering and computer vision, where it is difficult or infeasible to develop conventional algorithms to perform the needed tasks. Machine learning is closely related to computational statistics, which focuses on making predictions using computers.

Data mining is the process of discovering patterns in large data sets involving methods at the intersection of machine learning, statistics, and database systems. Data mining is an interdisciplinary subfield off computer science and statistics with an overall goal to extract information from a data set and transform the information into a comprehensible structure for further use. Data mining is the analysis step of the knowledge discovery in databases process. The goal of data mining is the extraction of patterns and knowledge from large amounts of data.

In science, computing, and engineering, a black box is a device, system or object which be viewed in terms of its inputs and outputs, without any knowledge of its internal workings. A black box model is a catch all term used to describe a computer program designed to transform various data into useful strategies. A typical black box approach analyses the behavior of the stimulus and response within an open system.

SUMMARY

Embodiments of the present invention provide a computer system, a computer program product, and a method that comprises ingesting tabular data from at least one modality of a plurality of modalities; simultaneously extracting data and generating a prediction model for a task of a computing device from the extracted data from at least two modalities in the plurality of modalities; generating a data signature based on the generated prediction model from the at least two modalities by leveraging the generated prediction model for ingested tabular data and extracted data; comparing the generated data signature to identified data signatures stored in at least one modality in the plurality of modalities; and performing a task based on the generated data signature and a validation of the comparison of identified data signatures.

BRIEF DESCRIPTION OF THE DRAWINGS

FIG. 4A-K are figures illustrating examples of a multi-modal explainer pipeline, in accordance with at least one embodiment of the present invention.

DETAILED DESCRIPTION

Embodiments of the present invention recognize the need for an improvement to local interpretable model-agnostic explanations such as LIME and other local interpretable explanations by leveraging multiple modalities to generate a multi-modal explainer pipeline within an environment comprised of computing devices. Embodiments of the present invention provides systems, methods, and computer program products for an improvement to existing local model-agnostic services and machine learning services based on data mining. Currently, local interpretable explainability services explain predictions of a modality in an interpretable manner by learning an interpretable model locally around the prediction. The local explanations are obtained using sparse linear regression on the perturbed neighborhood of the given instance and the corresponding black box predictions. However, embodiment of the present invention provides an improvement to current such services by applying multiple modalities such tabular data. Existing services can work individually on tabular data and text; but the embodiments of the present invention learn from the local model-agnostic services and applies the data learned with unstructured text analytics simultaneously to derive complementary explanatory insights. Thus, the embodiments of the present invention are multi-modal. Accordingly, embodiments of the present invention infer explanatory insights in the presence of the data from different modalities. Furthermore, embodiments of the present invention perform a data service in the absence of a black box by generating an effective black box using graph semantic models before analyzing the data within the black box. Embodiments of the present invention represent a real-world customer engagement to explain anomalies in data modalities. Embodiments of the present invention accesses multiple modalities, extracts data from accessed multiple modalities, leverages extracted data into an explainer, generates explanations from the explainer, and validates the generated explanations.

Figure 1:
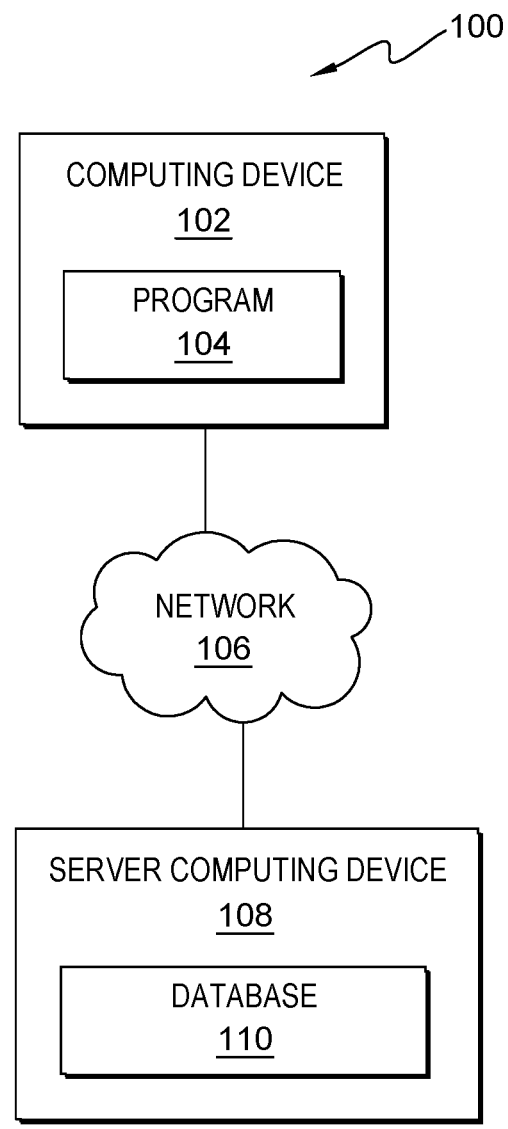
FIG. 1 is a functional black diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 ingests raw data, simultaneously extracts data and generates target labels from the ingested raw data, generates a failure prediction analysis table based on extracted data, generates a best model based on the generated failure prediction analysis table, predicts holdout data based on the best model, and evaluates the prediction. In this embodiment, the program 104 ingests raw data from multiple modalities. An example of the raw data that the program ingests is sensor data, alert data, and notification data. In this embodiment, the program 104 ingests the data by performing a query on a database 110 where the raw data is stored. In this embodiment, the program 104 performs the query of the database 110 by using data quality information to pre-screen, identifying good quality data, and cleaning data with rules provided by a subject matter expert ("SME") from domain. In this embodiment, the program 104 extracts data from a source modality using as a rolling window feature. In this embodiment, the program 104 uses the prediction window size and the prediction resolution to generate a target label for each failure in training data in order to capture the failure. In this embodiment, the program 104 generates a failure prediction analysis table using a combination of the rolling window feature and the generated target label, In this embodiment, the program 104 generates a best model by using modeling data based on the training set classifier of the failure prediction analysis table and the validation set classifier to produce an initial prediction. In this embodiment, the program 104 generates a final prediction based on the generated best model. In this embodiment, the program 104 predicts holdout data of the best model. In this embodiment, the program 104 evaluates the final prediction based on the best model.

In another embodiment, the program 104 accesses multiple modalities, learns data tags features, generates instance-based explanations for each learned feature, extracts coefficients of explanation to generate a signature for each instance, organizes learned features based on extracted coefficients to identify top explanatory features, and stores the learned signatures for each feature within a database 110. For example, the program 104 accesses time series data, text data, and graph data; learns data tags for each data feature; generating a data feature-based explanation and a context-based explanation based on the learned features; extracts sensor data from the time series data, extracts notification component data from the text data, and extracts semantic data from the graph data to generate a single explainer; learns signatures based on the generated explainer and extracted data; and stores the learned signatures within a database.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention. The network 106 can include one or more wired and/or wireless networks that are capable of receiving and transmitting data, voice, and/or video signals, including multimedia signals that include voice, data, and video information. In general, network 106 can be any combination of connections and protocols that will support communications between server computing device 108 and computing devices 102 within computing environment 100. In various embodiments, the network 106 operates locally via wired, wireless, or optical connections and can be any combination of connections and protocols (e.g., personal area network ("PAN"), near field communication ("NFC"), laser, infrared, ultrasonic, etc.).

The server computing device 108 may include the program 104 and may communicate with the computing device 102 via the network 106. The server computing device 108 can be a standalone computing device, a management server, a web server, a mobile computing device, or any other electronic device or computing system capable of receiving, sending, and processing data. In other embodiments, the server computing device 108 can represent a server computing system utilizing multiple computers as a server system, such as in a cloud computing environment. In another embodiment, the server computing device 108 can be a laptop computer, a tablet computer, a netbook computer, a personal computer ("PC"), a desktop computer, a personal digital assistant ("PDA"), a smart phone, or any programmable electronic device capable of communicating with computing devices (not shown) within the computing environment 100 via the network 106. In another embodiment, the server computing device 108 represents a computing system utilizing clustered computers and components (e.g., database server computers, application server computers, etc.) that act as a single pool of seamless resources when accessed within the computing environment 100.

Figure 2:
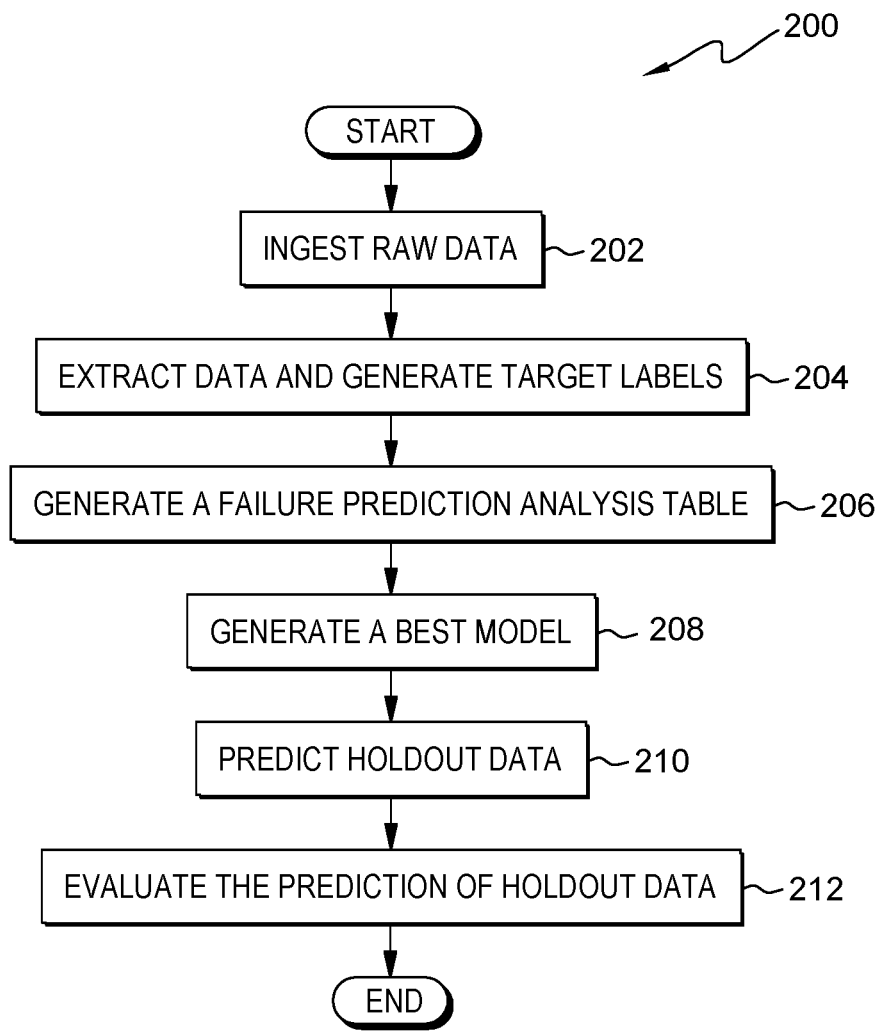
FIG. 2 is a flowchart illustrating operational steps for generating a multi-modal prediction model in the absence of a black box, in accordance with at least one embodiment of the present invention.

FIG. 2 is a flowchart 200 illustrating operational steps for generating a multi-modal prediction model in the absence of a black box, in accordance with at least one embodiment of the present invention.

In step 202, the program 104 ingests raw data. In this embodiment, the program 104 ingests raw data from multiple modalities based on a performed query of the database 110 stored on the server computing device 108. In this embodiment, the program 104 receives opt-in/opt-out permission from a user to gain access to a specific modality. In this embodiment, raw data is defined as data that has not been processed for use, and information is defined as the end product of data processing. In this embodiment, the program 104 performs the query of the database 110 by using data quality information to pre-screen, identifying good quality data, and cleaning data with rules provided by a subject matter expert. For example, the program 104 may access linear modalities, tabular modalities, time series modalities, graph modalities, and text modalities.

In step 204, the program 104 simultaneously extracts data and generates target labels from the ingested raw data. In this embodiment, the program 104 extracts data from a source modality using as a rolling window feature. In this embodiment, the program 104 extracts data in a form that correlates with the accessed modality in which the data is extracted. In this embodiment, the program 104 extracts data from multiple modalities using an extraction feature, using components with tools for data extraction, and building information extraction to extract semantic data from the graph data. In this embodiment, the rolling window feature refers to the computation of temporal features for any given time window. For example, the program 104 extracts data as a feature of a sum, a skew, a kurtosis, a $25^{th}$ quantile, a $75^{th}$ quantile, and an interquartile range. In this embodiment, the program 104 extracts data based on a history window size and a prediction resolution. In this embodiment, the history window size refers to the length of the lookback window of the computation. In this embodiment, prediction resolution refers to the granularity that measurements have been computed for the data. A prediction window size refers to the size of the look-ahead window for capturing how early in time the program 104 wants to predict the failure.

In this embodiment, the program 104 generates a target label in response to ingesting failure data. In this embodiment, the program 104 generates a target label for each failure data observed in the extracted data. In this embodiment, the program 104 generates a target label for based on a history window size for extracted data and a prediction resolution for extracted data. For example, the program 104 generates a target label for sensor data based on extracted time series data, generates a target label for semantic based on extracted graph data, and generates a target label for notification data based on extracted text data.

In step 206, the program 104 generates a failure prediction analysis table based on extracted data. In this embodiment, the program 104 generates a failure prediction analysis table using a combination of the rolling window feature and the generated target label. In this embodiment, the failure prediction analysis table consists of several classifiers with fine-tuned parameter details, and these classifiers are training set data and validation set data. In this embodiment, the training set data is pre-saved data stored on the database 110. In this embodiment, the training set data is what the model is trained on. In this embodiment, the validation set data comprises confirmations and comparisons of extracted data to observed failures. In this embodiment, the validation set data is defined as a test data set. For example, the program 104 generates a table of predicted failures based on extracted data and generated target labels for unstructured text data, time series data, and semantic graph data into black box model that forms the multi-modal explainer.

In step 208, the program 104 generates a best model based on an initial prediction. In the embodiment, the program 104 generates the best model based on the generated failure prediction analysis table. In this embodiment, the program 104 generates multiple models based by using modeling data based on the training data set classifier and selects a single model based on the validation set classifier of the failure prediction analysis table. In this embodiment, the program 104 generates the best model by selecting a best estimation using the comparisons and confirmations of the validation data set from the multiple generated models based on the training data set classifier of the generated failure prediction analysis table. In another embodiment, the program 104 generates an explanation based on the model generated from the failure prediction analysis table. For example, the program 104 generates a best model that meets the estimations of the predictions based on the failure prediction analysis table.

In step 210, the program 104 predicts holdout data based on the generated best model. In this embodiment, the program 104 predicts holdout data by setting a predicted target label failure as 1 and an actual failure date label as 0, and the program 104 sets the actual failure date label as 0 because there is no advance warning when the program 104 predicts the failure on the day of the actual failure. In this embodiment, holdout data is defined as a split in a data set, where one split is a test data set and another set is a train data set, and the program 104 uses the validation set data, or test data, to predict how well the best model performs on unseen data. For example, the program 104 predicts the performance of the best model to unseen data based on the validation set data.

In step 210, the program evaluates the prediction of holdout data. In this embodiment, the program 104 evaluates the prediction by comparing the generated prediction to the generated best model. In step 210, the program 104 evaluates the prediction by using machine learning algorithms and artificial intelligence algorithms to estimate the holdout data based on the test data of the best model. For example, the program 104 evaluates the final prediction based on the data output of the best model.

Figure 3:
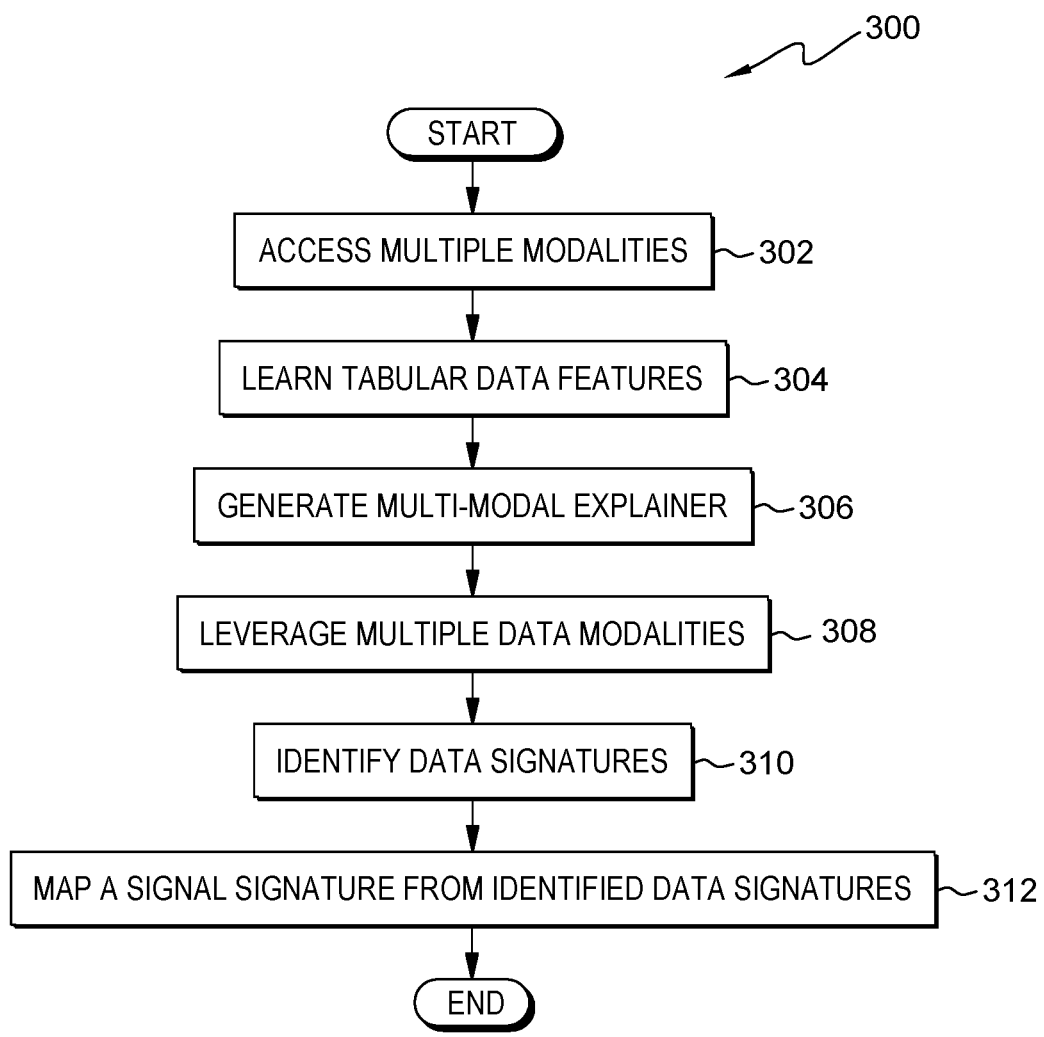
FIG. 3 is a flowchart illustrating operational steps for organizing explanation signatures and explanatory features based on extracted coefficients, in accordance with at least one embodiment of the present invention.

FIG. 3 is a flowchart 300 illustrating operational steps for organizing explanation signatures and explanatory features based on extracted coefficients, in accordance with at least one embodiment of the present invention.

In step 302, the program 104 accesses multiple modalities. In this embodiment, the program accesses multiple forms of data, or modalities, and assigns tags based on the data accessed. In this embodiment, the program 104 simultaneously accesses multi-modalities, allowing the program 104 to generate a multi-modal explainer. In another embodiment, the program 104 accesses a single modality. For example, the program 104 accesses tabular data modality, a time series data modality, a black box anomaly data modality, and a local post-hoc explainability algorithm modality as input.

In step 304, the program 104 learns tabular data features from a tabular data modality. In this embodiment, the program 104 uses artificial intelligence algorithms and machine learning algorithms to learn temporal features based on a history window size. In another embodiment, the program 104 uses artificial intelligence algorithms and machine learning algorithms to learn data signatures that correlates with tabular data modalities. In this embodiment, the program 104 learns data tags for temporal features by computing the length of a lookback window for a particular feature. For example, the program 104 learns data tags for temporal features such as sum, skew, kurtosis, $25^{th}$ quantile, $75^{th}$ quantile, and interquartile range. In another embodiment, the program 104 simultaneously learns tabular data features from multiple modalities.

In step 306, the program 104 generates a multi-modal explainer for each learned data tag. In response to learning data tag features, the program 104 generates a general explainer based on fusing the multiple accessed modalities. In this embodiment, the program 104 uses a local post-hoc algorithm to generate the multi-modal explainer based on learned data features by predicting failures in performance. In another embodiment, the program 104 uses prediction window sizes of data to learn data tags of the temporal features. In this embodiment, the program 104 uses a local post-hoc explainer algorithm from a local interpretable explainer modality in conjunction with a black box model to generate explanations for each learned tag or signature. In another embodiment, the program 104 uses local interpretable explainer to create a perturbed neighborhood around an instance and creates a sparse linear model on top of the neighborhood with a responsible variable as predictions of the black box model. In this embodiment, the instance-based explanations are information produced from raw, ingested data using a particular instance. In this embodiment, a neighborhood is a detailed form of multiple explanations. For example, the program 104 generates a feature-based explanation and a context-based explanation based on the learned data tags from multiple modalities.

In step 308, the program 104 leverages multiple data modalities based on generated explainers. In this embodiment, the program 104 leverages the generated multi-modal explainer by extracting coefficients for each learned tabular feature. In this embodiment, the program 104 analyzes extracted positive weighted coefficients and negative weighted coefficients; identifies a prediction of a task using the analysis of the shared weighted coefficients (positive and negative); calculates a prediction of failure based on a majority of shared coefficients being negative weighted coefficients; and validates a failure prediction based on the analysis of the extracted coefficients, the identified prediction and the prediction calculation. In this embodiment, the program 104 uses the leveraged explainers to generate a signature for each learned tabular data feature. In this embodiment, the multiple data modality by extracting coefficients of each generated explanations for each learned data tag to generate a signature. In this embodiment, the program 104 extracts explainer tags and regression coefficients to leverage the generated multi-modal explainer. In this embodiment, explainer tags are data tag features with the highest regression coefficient weight, and regressive coefficients constitute a unique signature for the learned data tag feature. In this embodiment, the program 104 extracts positive weighted coefficients and negative weighted coefficients and uses these weighted coefficients to form a prediction. For example, the program 104 extracts six explainer tags and, of the six extracted tags, five are positive weighted regressive coefficients and one is a negative weighted regressive coefficient.

In step 310, In another embodiment, the program 104 identifies similar data signatures from multiple modalities. In this embodiment and in response to leveraging the generated multi-modal explainer, the program identifies similar signatures to compare to the generated signatures. In this embodiment, the program 104 identifies similar signatures by organizing learned tabular data features based on extracted coefficients. In this embodiment, the program 104 organizes learned tabular data features by ranking learned data features based on the weighted regressive coefficients, returning the learned data features in a descending order of weight, and identifying the top learned data feature. In this embodiment, the program 104 ranks the learned data features based on the weighted regressive coefficients, and the positive weighted coefficients are defined as higher than the negative weighted coefficients. In this embodiment, the program 104 returns the ranked data tag features to the database 110 via the network 106. In this embodiment, the program 104 identifies the highest weighted data tag feature based on the ranked coefficients.

In step 312, the program 104 maps a signal signature from identified similar data signatures. In this embodiment, the program 104 maps a signal signature from identified similar signatures to components within the computing device 102 by using a natural language understanding algorithm. In this embodiment, a signal signature from multiple identified signatures and may be output data, failure predications, and failure observations. In this embodiment, the program 104 transmits data to the components of the computing device 102 using machine learning algorithms. In this embodiment, the program 104 uses a natural language understanding algorithm to transmit data to the components of the computing device 102. In this embodiment, the program 104 generates a data signature by analyzing the generated prediction model, generating a baseline based on the analysis of the generated prediction model; training the generated prediction model to identify data signatures of a task based on the generated baseline; identifying pre-stored data signatures of the task from at least one modality; and selecting a shared data signature from the trained generated prediction model and the identified data signatures.

In another embodiment, the program 104 measures the performance improvement of the computing device 102 by analyzing the comparison of the generated failures or signatures for each of the learned data features and observes the performance of the computing device 102. In another embodiment, the program 104 stores the learned data tag features as signatures within a database 110. In this embodiment, the program 104 stores the entire learned data tag feature of the positive weighted coefficients and negative weighted coefficients to learn an entire signature of the accesses modality on the database 110 located on the server computing device 108 via the network 106. In this embodiment, the program 104 leverages the learned signatures to predict performance of unseen data based on learned data tag features and extracted coefficients.

Figure 4A:
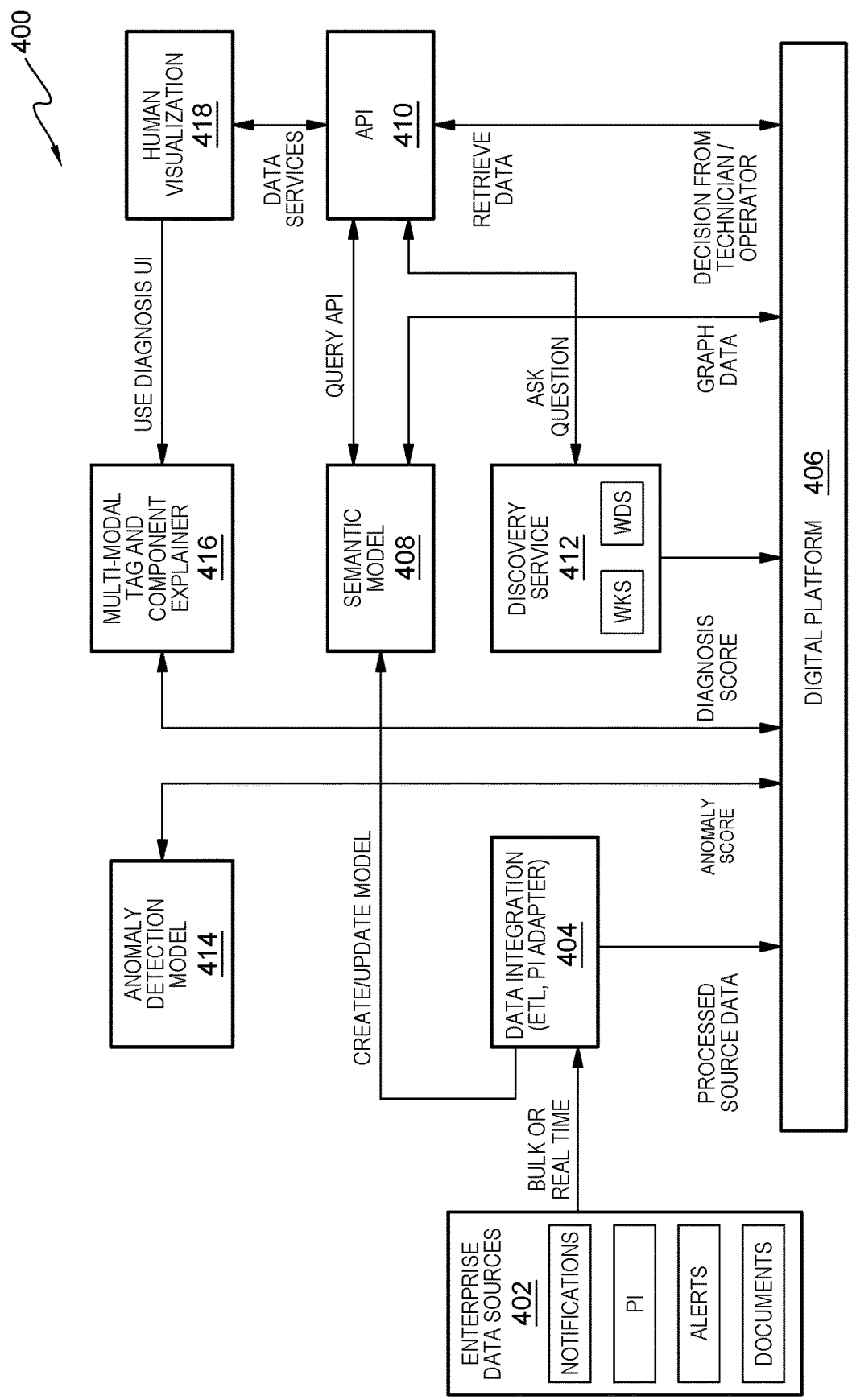

FIG. 4A illustrates exemplary FIG. 400, an example of a multi-modality explainer, in accordance with an embodiment of the present invention. Exemplary FIG. 400 includes sensor data 402, such as notifications, alerts, documents and personal information, which are multiple modalities; data integration 404, such as a data adapter, which receives data in bulk or real time and transmits processed source data to a digital platform 406; a semantic model 408, which receives model data from the data integration 404, communicates graph data with the digital platform 406, and communicates query data with an application programing interface ("API") 410; the API 410, which retrieves data from the digital platform 406, communicates query data with the semantic model 408, transmits decision data from an operator to the digital platform 406, and communicates a question to a discovery service 412; the discovery service 412, such as a knowledge tool or discovery tool, which transmits data to the digital platform 406 and communicates a question to the API 410; an anomaly detection model 414, which communicates an anomaly score with the digital platform; a multi-modal tag and component explainer 416, which communicates a diagnosis score to the digital platform 406 and receives use diagnosis data with a human visualization 418; and the human visualization 418, which communicates data service data with the API 410 and transmits use diagnosis data to the multimodal tag and component explainer 416.

Figure 4B:
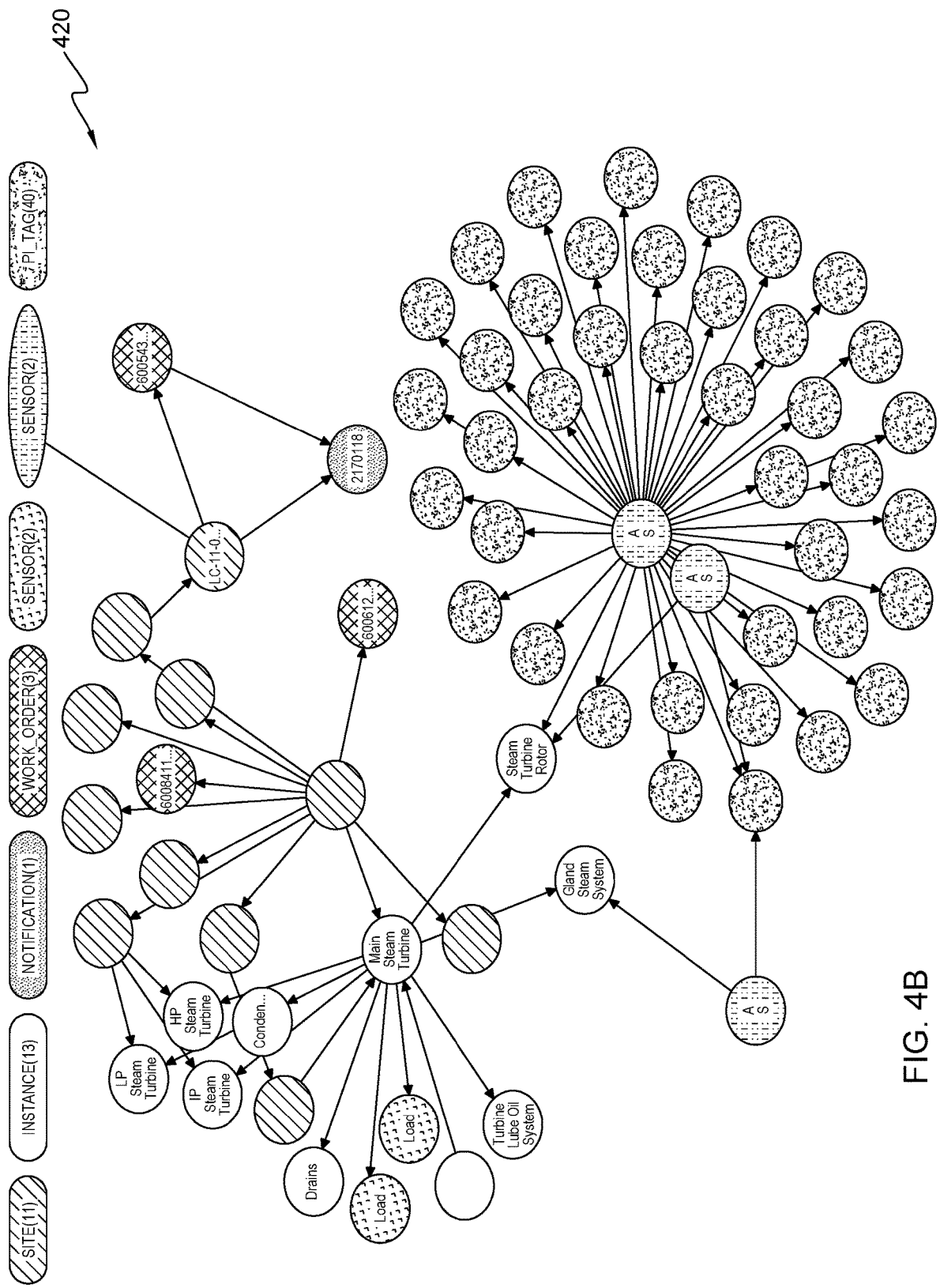

FIG. 4B illustrates exemplary graph 420, which is a semantic model depicting a multi-modal explainer where the total number of tags associated to a mechanical vibration use case is 40 tags out of 500 which inherently identifies a useful subspace for the multi-modal explainer model to operate on.

FIG. 4C illustrates exemplary code fragment 422, which is a code fragment depicting a query of the exemplary graph 420 containing a set of custom-built functions to identify relevant tags. For example, exemplary code fragment 422 is a Jupyter Notebook.

Figure 4D:
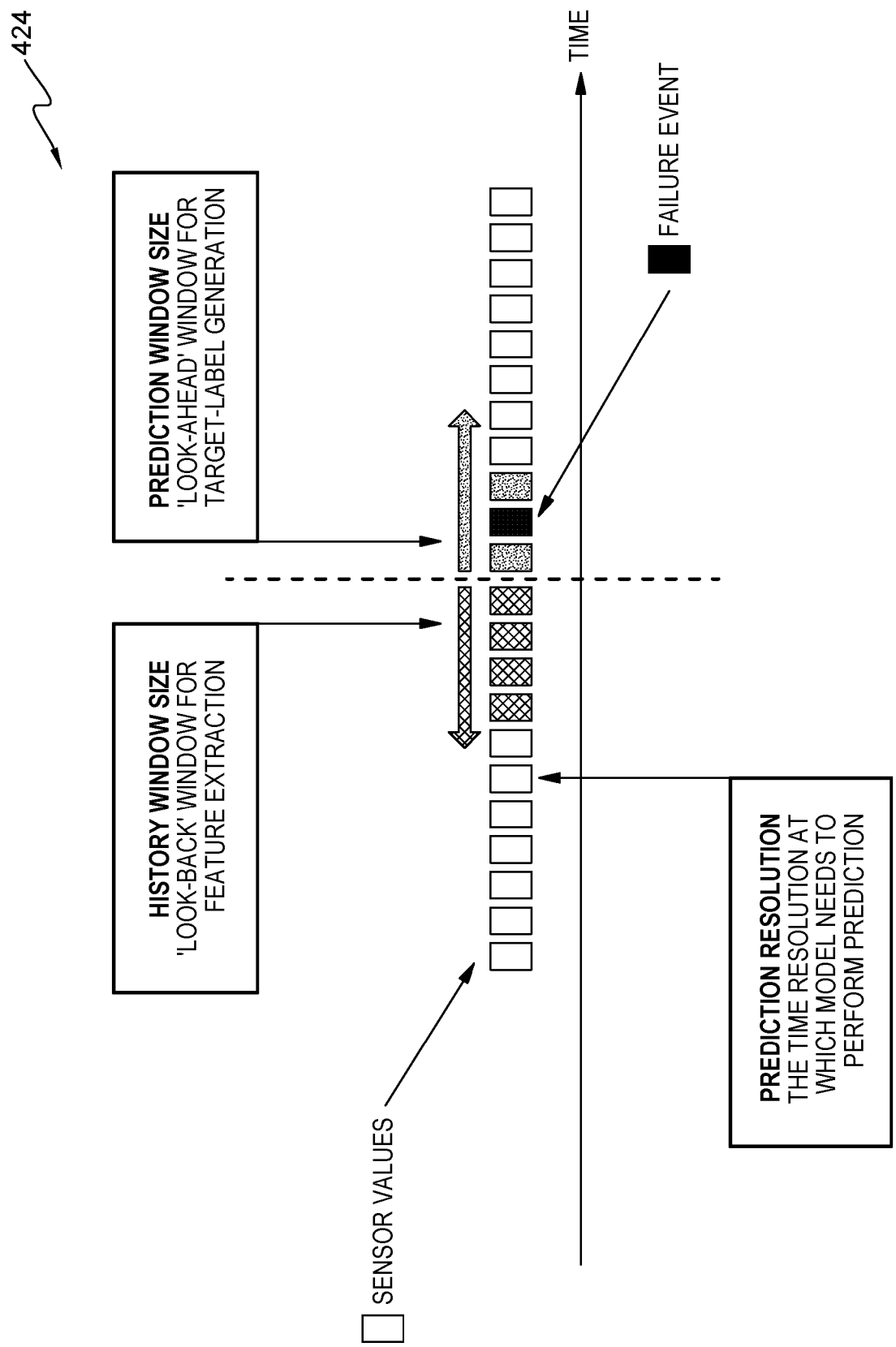

FIG. 4D illustrates exemplary graph 424, which is a feature extraction graph based on time series data depicting temporal features for any given time window. For example, exemplary graph 424 depicts a failure event using time as a x-axis and calculates history window size, prediction window size, and the prediction resolution.

Figure 4E:
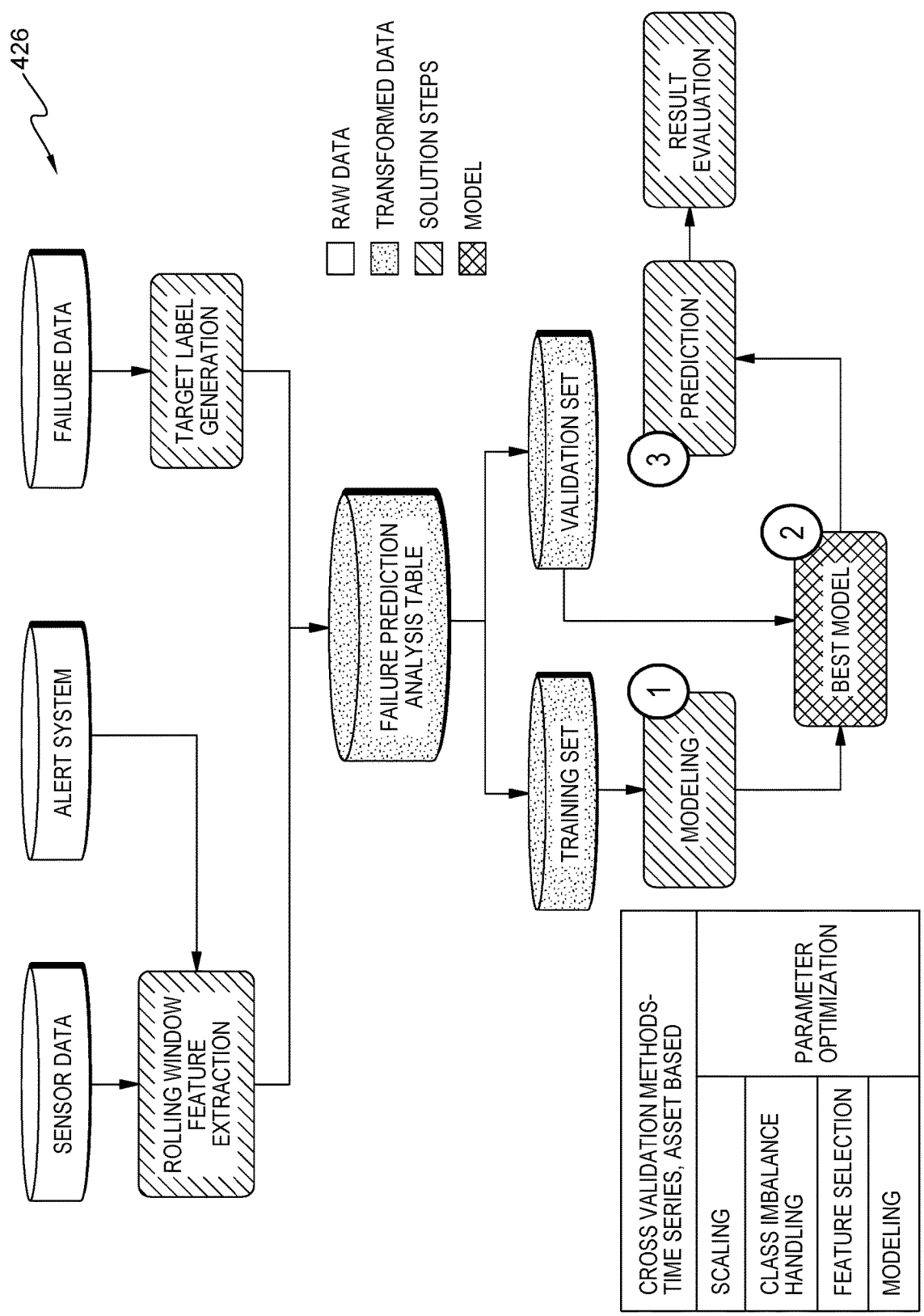

FIG. 4E illustrates exemplary FIG. 426, which is an example illustration generating a multi-modal explainer pipeline. FIG. 4E depicts the flowchart 200 of FIG. 2.

FIG. 4F illustrates exemplary table 428, which depicts a table 428 with multiple sections for notification information, a knowledge tool component, and multiple sections for expert components to further illustrate how a notification, masked for confidentiality, can be input into a knowledge service tool to identify components and subsequently identify expert validated components.

Figure 4G:
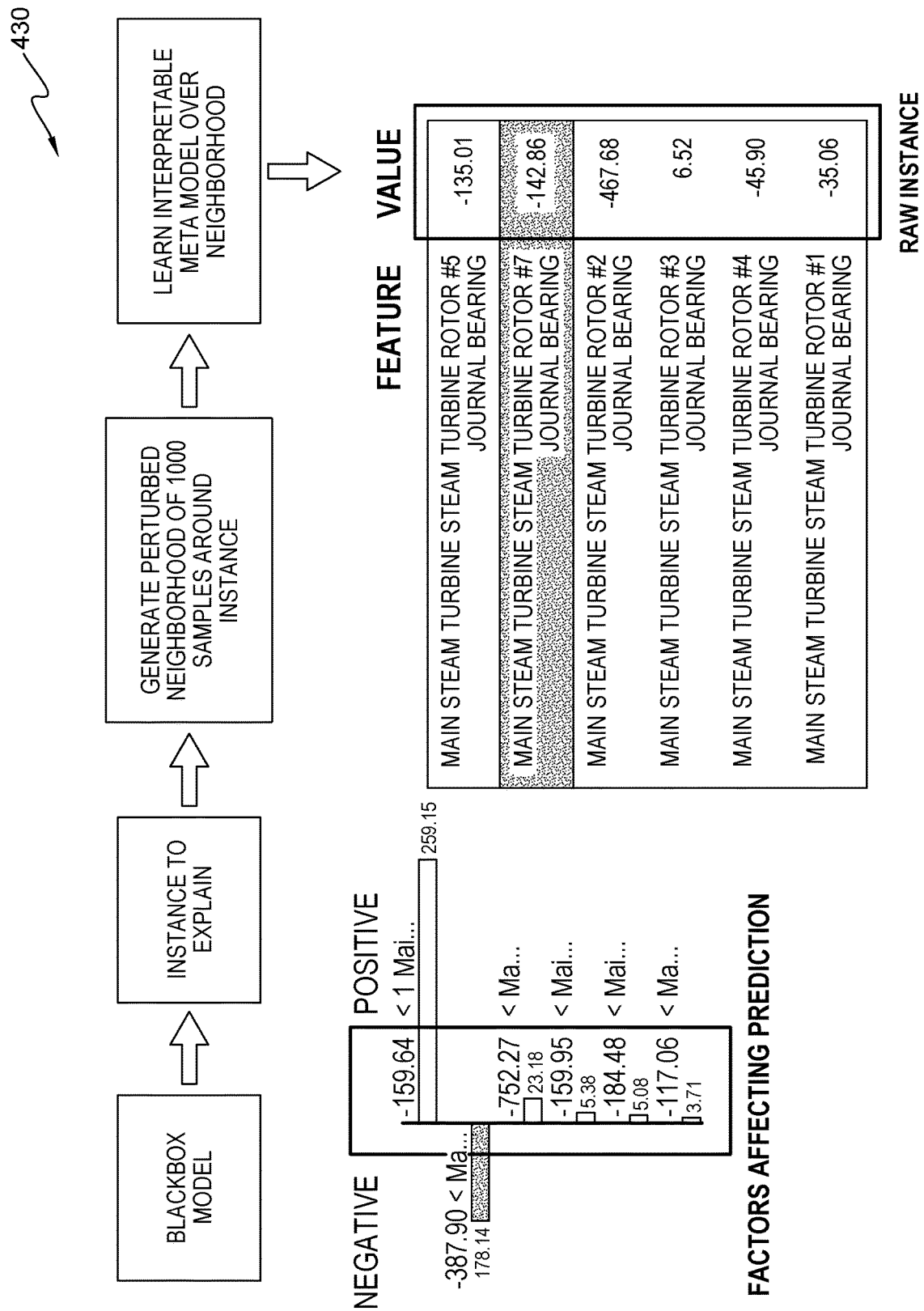

FIG. 4G illustrates exemplary table 430, which depicts an explainer highlighting important tags along with their importance explaining the current prediction. Exemplary table 430 creates a perturbed neighborhood around an instance and creates a sparse linear model on top of the neighborhood with the response variable as predictions of the black box on the neighborhood.

Figure 4H:
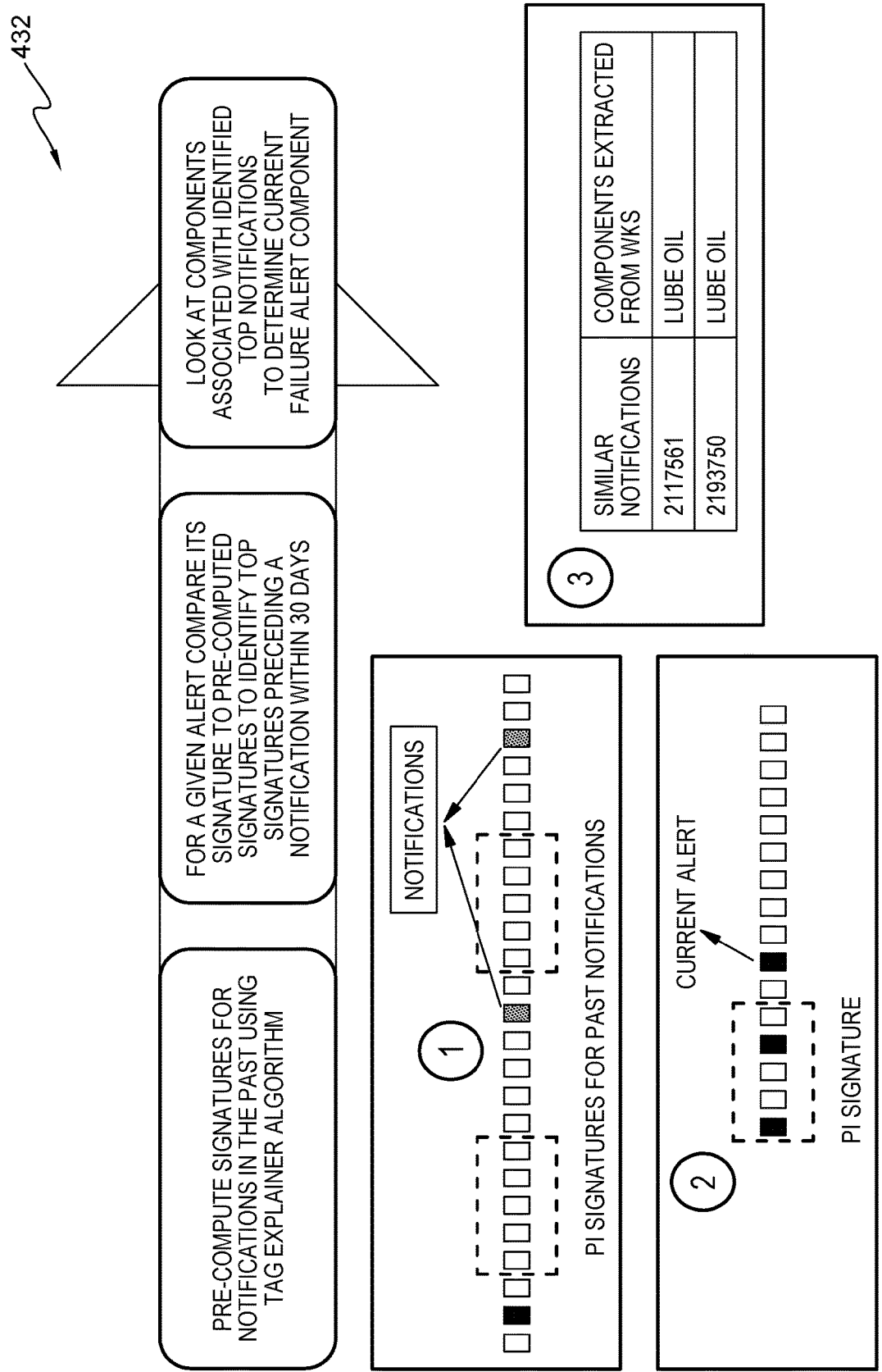

FIG. 4H illustrates exemplary FIG. 432, which depicts a component explainer illustrating how a current learned signature is mapped onto the timeline of past learned signatures to identify similar ones preceding a notification of the past. Exemplary FIG. 432 uses the signatures learned from the tag explainer approach on the training data as input along with expert annotated notifications and the current instances from test which need to be mapped to a component level explanation.

Figure 4I:
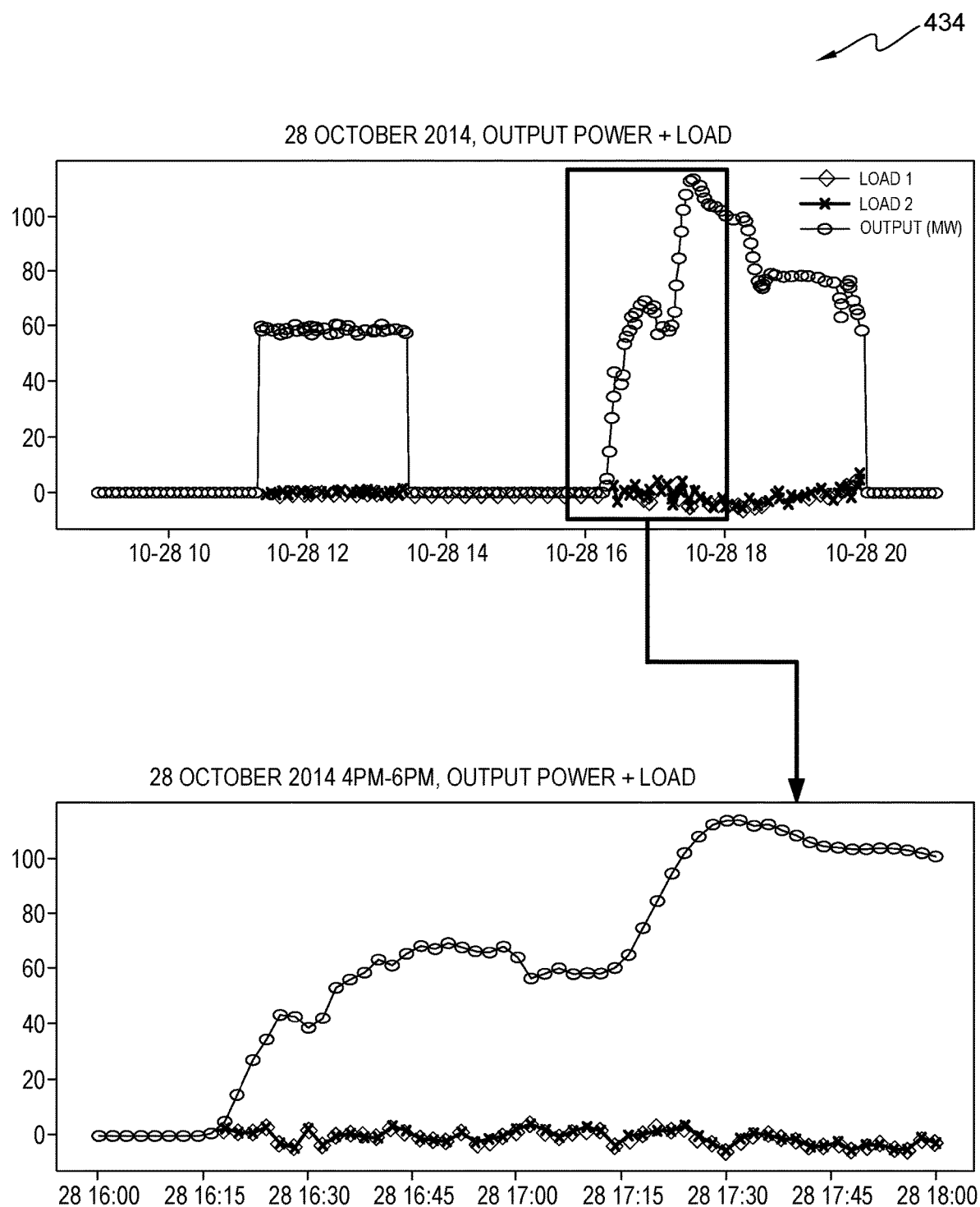
Figure 4J:
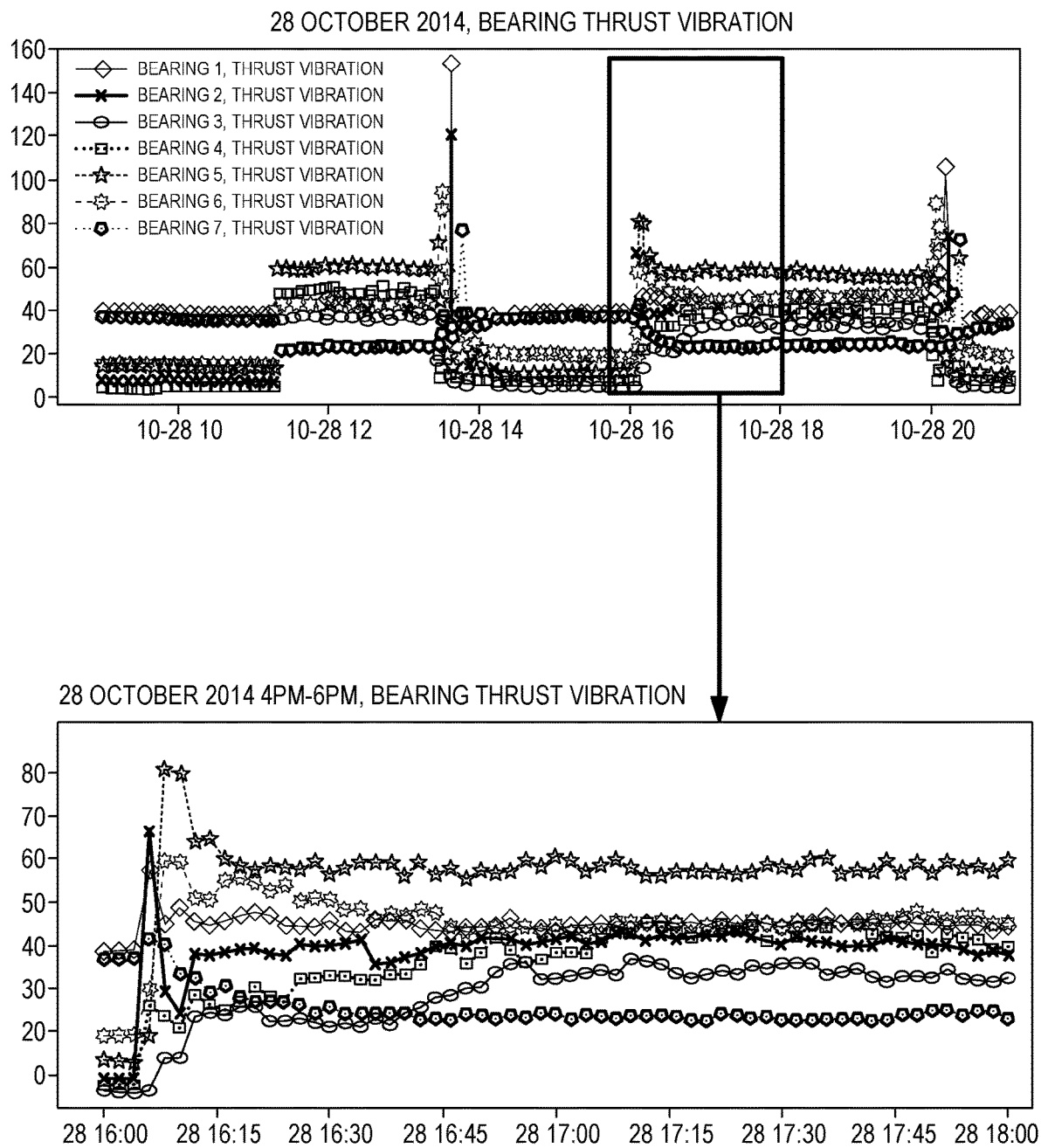
Figure 4K:
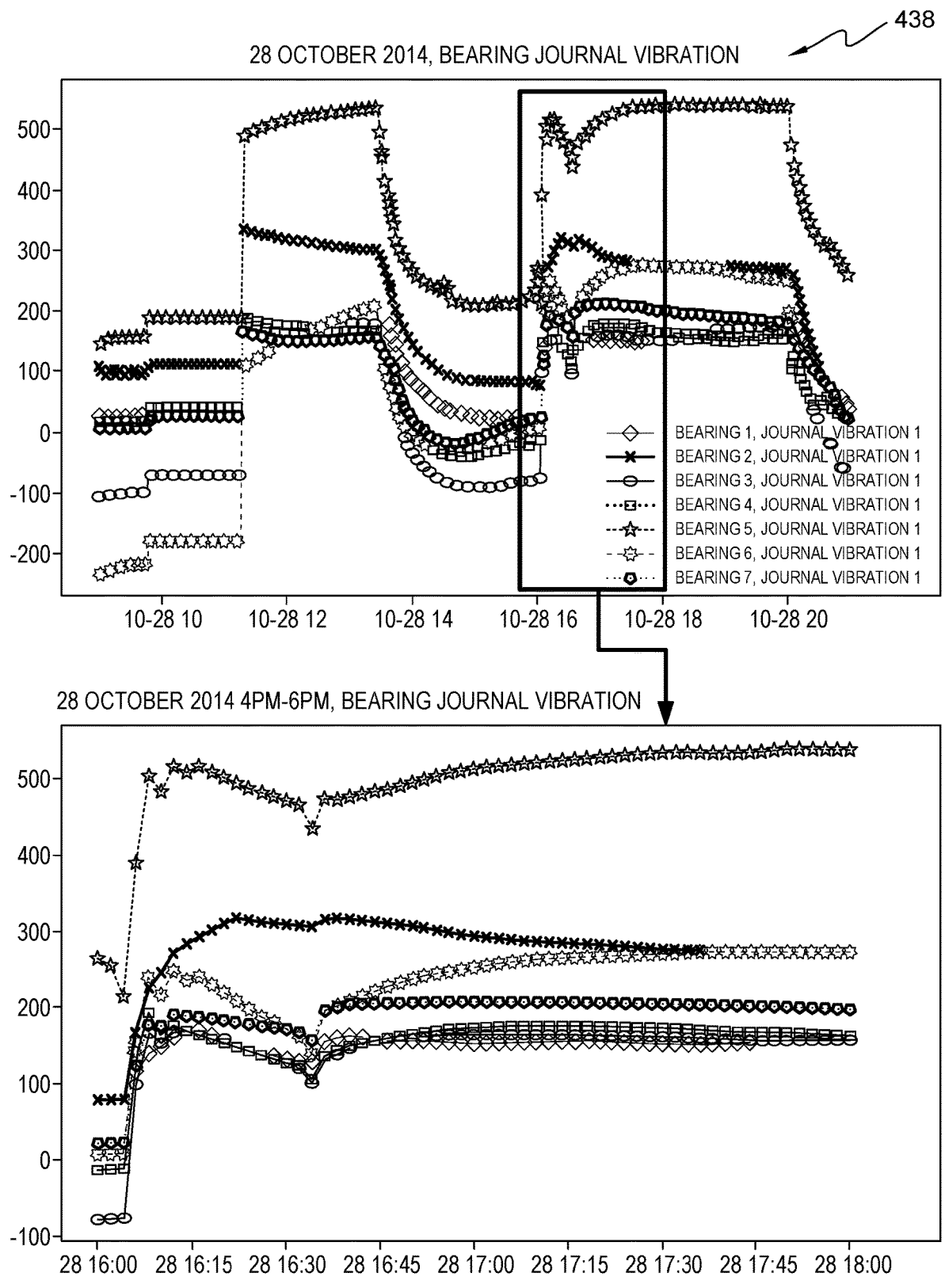

FIGS. 4I, 4J, and 4K illustrates exemplary FIGS. 434, 436, and 438, depict a critical failure that plots the relevant tags from a mechanical vibration semantic model long with a zoomed in view (right side) for a user to investigate the window of interest. In FIG. 4I, exemplary FIG. 434 depicts a visualization based on output power and load on Oct. 28, 2014, between 4 pm and 6 pm. In FIG. 4J, exemplary FIG. 436 depicts a visualization based on bearing thrust vibration on Oct. 28, 2014, between 4 pm and 6 pm. In FIG. 4K, exemplary FIG. 438 depicts a visualization based on bearing journal vibration on Oct. 28, 2014, between 4 pm and 6 pm.

FURTHER COMMENTS AND/OR EMBODIMENTS

Some embodiments of the present invention recognize the following facts, potential problems, and/or potential areas for improvement with respect to the current state of the art.

Explainable artificial intelligence ("AI") has been gaining a lot of attention from the industrial machine learning community as it helps to establish trust and confidence in the outcome of an algorithm or an artificial intelligence system. AI for Industry 4.0 has seen the growth of complex machine learning techniques being applied to multi-modal data such as temporal data from sensors along with textual data from logs and reports, and image data as well. Some embodiments of the present invention comprise models that are very opaque and do not offer explainable insights to an operator. This lack of transparency hinders an operator's ability to do decision making thereby impacting the adoption of such systems across a wider range of problems. Some embodiments of the present invention develop key industry specific machine learning ("ML") pipelines to address these challenges using explainable AI techniques such as LIME in conjunction with several machine learning platforms and natural language understanding ("NLU") tools. These pipelines leverage multiple modalities such as time series data, unstructured text and domain semantic models to augment the behavior of a black box prediction model with explainable insights. Some embodiments of the present invention present a systematic domain-driven approach to learn an effective anomaly detection black box model before understanding it further with explainer pipelines. Key validation insights obtained from a subject matter expert after applying pipeline for a customer engagement with a multinational energy company are presented.

For example, Energy and Utilities ("E&U") industry worldwide is moving towards a broad vision to reduce manual effort for asset health management using artificial intelligence techniques. Such advanced systems can aid an onsite engineer by providing prescriptive actions for asset maintenance and reduce asset unavailability and its associated financial costs. Effective anomaly detection systems can also preempt critical failures for huge thermal energy assets (such as steam turbines) and also reduce the associated carbon footprint through effective asset utilization for energy production. Such systems are of immense interest in Industry 4.0 since most manufacturing systems contain complex dynamics, e.g., multibody and multiscale interactions, time-delay dynamics, feedback loops, and exogenous forces which makes this problem very technically challenging. In addition, there are several system-level challenges which need to be addressed such as:

Ingesting large scale Internet-of-Things (IoT) time series data from hundreds of sensors and fusing such data with historical performance data extracted from unstructured maintenance logs.

Incorporating domain semantics into the model building process. For example, a main steam turbine has a complex set structure such as high, medium, and low-pressure sections, as well as supporting equipment such as lube oil, seal steam system which need to be modeled.

Recommending explanatory insights to an operator. For example, a turbine bearing high vibration anomaly could be explained by a high temperature mismatch of the turbine casing.

FIG. 4A presents a workflow of the end-to-end real-time explainable anomaly detection system. The core components of the system are (a) anomaly detection model and (b) explainer models which are custom built ML pipelines that can interact and co-exist with other functionalities in the system. The flow of this system can be explained as follows, the inputs to this system are the enterprise data sources. Subsequently, data is preprocessed using the extract transform load (ETL) module using the preprocessing methods. This data is persisted on to a digital platform.

The semantic model here captures relationships between different components of an asset (for example, seven bearings capture mechanical vibration for a turbine). The pre-existing semantic model module in the system is updated real-time based on the input data if necessary, which is then leveraged by the anomaly detection model. Some embodiments of the present invention present a systematic method to learn effective anomaly detection models by exploiting temporal characteristics of the data along with a scalable approach to identify the best performing algorithm. Anomaly scores obtained are persisted to the digital platform. Some embodiments of the present invention use a multi-modal explainer module which consists of a tag explainer and a component explainer, where the former identifies important input features explaining the current prediction by the anomaly model, and the latter can associate a physical component level explanation with a prediction. Some embodiments of the present invention comprise a component explainer that leverages cloud platform services, AI services, and machine learning services to understand the context associated with the unstructured maintenance logs. Explanatory insights from both these pipelines are also persisted to the digital platform and describes the backend of the system.

Some embodiments of the present invention have an operator interact with a real-time explainable AI system using the API and the human visualization module. This module helps a user inspect a certain window of interest and overlays the important sensor data, logs and top explainer insights. Some embodiments of the present invention propose explainer pipelines which can infer from multiple modalities such as time series, text and semantic information to discover useful insights from real-world data. Some embodiments of the present invention benchmark performance of an anomaly detection algorithm on a public industrial time series dataset w.r.t other anomaly detection methods. Some embodiments of the present invention present the evaluation by the subject matter expert on how useful the discovered insights are for preempting critical failures (e.g., high impact failures for the steam turbine). Some embodiments of the present invention propose an end-to-end system which can use the explainer pipelines in conjunction with domain semantic models and anomaly detection models to aid a plant operator.

The input data sources can be categorized into the following four categories, namely, sensor data, notifications, alerts, and documents. Some embodiments of the present invention define sensor data as time sensor data, which is also referred to as tag or pitag data. Some embodiments of the present invention define notification data as a list of unstructured maintenance logs which include details of asset condition assessment and any corresponding actions performed by an engineer. Some embodiments of the present invention define alert data as an anomaly scoring system that compares clusters of normal and abnormal patterns of sensor data to identify patterns that differentiate them. It can function both as a black box that explains using explainers or as a score-based meta input feature to the anomaly detections model. Some embodiments of the present invention use the latter setting for alerts in the analysis done, and an alert model comprises the set of features used for obtaining the alert anomaly scores. Some embodiments of the present invention define document data as a list of critical asset failures with specific comments on what caused the failure along with failure classification, engineer assessment and remediation actions.

Some embodiments of the present invention persist raw sensor data on the digital platform. Some embodiments of the present invention use a cloud service to query the database. The main steps involved in data preprocessing are using data quality information to pre-screen, identifying good quality data, and cleaning data with rules provided by the subject matter expert from domain. For example, sensor data annotated as usable data is considered as valid numeric data for ingestion and preprocessing, and data with a specific quality field set was ignored. For example, if megawatt is close to zero, the plant is not operating, and this data can be excluded. Information on holidays and other days where it is known that the plant is not operation can also be excluded.

Some embodiments of the present invention use a semantic model and its role in the proposed system. A semantic model is a type of data and information model that organizes and stores data via a graph structure. It consists of nodes of information instances, and edges, or relationships between the nodes. Both the nodes and edges can be labeled, providing the ability to create very rich representations of data. In particular, a semantic model is realized via a graph database, and it can efficiently store and query many-to-many relationships, something that a traditional relational database has difficulty with (i.e. excessive number and cumbersome table joins). For a given asset class (e.g. Pump), it is useful to know the most common problem and failure types and being able to correlate problem and failure events with time series (e.g. data historian) and other data sources. It is typical for failure events to have companion logs (like in notifications and critical failures); to be able to perform robust reliability analyses, the events must be classified according to a problem code or failure code taxonomy. The semantic model can be used to create and maintain a taxonomy of problem and failure codes, and the codes can use the "inheritance" feature of the model, i.e. a boiler feed pump is derived from a process pump, therefore the feed pump inherits the standard pump's problem and failure codes, as well as adding its own. Some examples of relationships captured in the turbine semantic model are a notification related to a particular sub-site (or sub-location); a sub-site part of a site; a site related to a sensor group (e.g., bearing 1); a sensor group connected to sensor types (e.g., temperature); and a sensor type constituting a set of sensors. Such a semantic model can be created by soliciting domain expert knowledge, leveraging dictionaries and descriptive text associated with sensors, exploiting patterns used in the naming conventions of sensors. Some embodiments of the present invention use a combination of all the above approaches to capture the domain semantics of a turbine.

Leveraging such a semantic model narrows the scope of investigation for different scenarios in certain part of the graph. For example, in order to find relevant sensors to a specific notification, some embodiments of the present invention can navigate the graph, moving from that notification to the subsite it has occurred and then move to connected site, component and finally the sensors. In FIG. 4B, the total number of tags associated to a mechanical vibration use case is 40 tags out of 500 which inherently identifies a useful subspace for the ML model to operate on. An end-user can query this semantic model using a notebook containing a set of custom-built functions to identify relevant tags. FIG. 4C shows a code sample of such functions. These functions have been used throughout the pipeline when a particular set of tags were needed to be used to train a ML model.

The semantic model described earlier functions as a bridge for an anomaly detection model as it is able to identify the tags relevant for inclusion in the model. Some embodiments of the present invention observe that without using the semantic model, the ML pipeline was not able to identify the important mechanical vibration sensors from the large pool of sensor tags included. This affected the model performance also adversely.

In FIG. 4D, temporal features are computed for any given time window. Some embodiments of the present invention call this the rolling window feature extraction phase. History window size refers to the length of the lookback window on which computes the following features, namely sum (sum of sensor measurements); skew (compute skewness of the current window computed as $$\frac{3 \propto (\text{mean} - \text{median})}{\text{standard deviation}};$$

kurtosis (captures tailedness of the probability distribution described by the window, and the formula is defined as the fourth central moment divided by the square of the variance); $25^{th}$ quantile ($25^{th}$ quantile of the window); $75^{th}$ quantile ($75^{th}$ quantile for the window); and the interquartile range ($75^{th}$ quantile-$25^{th}$ quantile).

Prediction resolution refers to the granularity at which measurements have been computed for the data. Prediction window size is the size of the look-ahead window for capturing how early in time to predict the failure. This can be incorporated by creating a target label that are set to 1 for each failure in the training data k days in advance in order to capture the failure while model building. The actual failure date label is set to zero as there is no advance warning if a model predicts the failure on the day of the actual failure.

FIG. 4E demonstrates that the flow of a scalable anomaly detection pipeline ingests data from three sources, (a) sensor data, (b) alert data and (c) notifications. The rolling window feature extraction and target label are done as explained as an earlier section. The rolling window features, and the look ahead targets labels are joined to create the failure prediction analysis table which is passed to the scalable pipeline (modeling phase 1) which consists of several classifiers with fine-tuned parameter grids. Subsequently, once the best estimator has been selected in using the validation data, we use this model to obtain predictions on holdout data. In order to extract components from the notifications, some embodiments of the present invention use a knowledge studio tool. This tool requires a small dictionary of relevant concepts (synonyms) and is able to infer for the rest of unannotated text. Some embodiments of the present invention define 4 different type of entities "Asset", "Component", "Group", and "Problem". Each entity created a lemma, and several surface format of the known entity. For example, for the lemma format of "bypass valve" has included "bypass vlv", "bypass valve". Only few annotations are needed for the system to conclude on other surface formats. An illustration for the same is provided in subsequent sections which shows the components extracted from the notifications.

To evaluate the performance of the knowledge tool, some embodiments of the present invention trained a model on 80% of the notification data and tested it on the remaining 20% and evaluated how the entities in the text were correctly annotated with the correct type. The resulting F-Score was 90%. Some embodiments of the present invention use a discovery service to persist and index all the notifications to enable us to query them. The tool creates a field of enriched metadata for each notification using the model that we created from the knowledge tool. It includes all the concepts and keywords that were found in each notification. A discovery service query may include retrieving all the notifications between two specified dates which contain "component" type with the value of "pump" or "bearing".

Some embodiments of the present invention ask the Subject Matter Expert (SME) to manually evaluate the extracted components and the original notification text to identify a class (notification type) for each notification based on his assessment (expert component of FIG. 4F). As it is highly cumbersome for a SME to manually annotate each notification, some embodiments of the present invention learned automated association rules of the form from the set of notifications already having an expert component, to associate an expert component for each of the remaining notifications using the learned association rule. The unstructured text analytics done here with the guidance of a SME is very unique and it allows us to incorporate into the system the ability to truly handle multi-modal data which is often unexplored while building ML models for Industry 4.0.

The previous sections have outlined an approach to build an effective supervised anomaly detection model (black box for explainer purposes). Some embodiments of the present invention explain an approach for identifying top tags explaining the black box's behavior for any given instance. This approach can use any local model agnostic post-hoc explanation technique such as LIME as long as the system can learn a unique signature for each instance.

As illustrated in FIG. 4G, LIME works by creating a perturbed neighborhood around an instance and creates a sparse linear model on top of the neighborhood with the response variable as predictions of the black box on the neighborhood. Sparse linear models provide interpretable insights into major contributing features explaining the prediction. The regression coefficient weights of the sparse linear model across all features constitute a unique signature for that data point. Positive weights may be shown in orange color and negative weights in blue, respectively. Some embodiments of the present invention apply the rolling window feature extraction and pass this new instance to the black box anomaly model trained at the end of phase in FIG. 4E. The top k explainer tags (features with highest regression coefficient weights) are extracted and the entire signature learned is persisted on to the digital platform. The learned signatures will be leveraged by the component explainer. The overall complexity depends on the number of instances, feature space (after rolling window) and the neighborhood size. The semantic model-based pre-selection helps in using only relevant features in the explanation model. Parameter choices are mentioned in a subsequent section.

Some embodiments of the present invention use the signatures learned from the Tag Explainer approach on the training data as input along with expert annotated notifications and the current instances from test which need to be mapped to a component level explanation. The intuition for this algorithm can be explained from FIG. 4H wherein the system is trying to look at signatures most similar to signatures learned in the past. Choice of 30-day window here is guided by SME input. The mapping from a signature to a notification to an expert validated component helps in obtaining component level explanations. This nicely compliments a tag explainer which uses only two modalities, sensor data and semantic model, whereas the component explainer uses the tag explainer and the third modality of unstructured text making it truly multi-modal. The component explainer can be applied directly to validation data using the training data and the pre-computed signatures. This can also be expanded to the test data by including the validation data along with training after learning the validation signatures. The computational complexity here is guided by the feature space on which we conduct similarity search for explanations which is again restricted by the semantic model making it computationally also viable.

Some embodiments of the present invention provided approximately 500 sensor tags per steam turbine from a multinational energy company. The resolution of data was at a second level. The history window size was set to 12 hours and the prediction window was set to 24 hours (1 day). For running a local post-hoc explainer model, some embodiments of the present invention used 500 perturbed neighbors per instance. Alert model used was the mechanical vibration model. The algorithms used in the anomaly detection pipeline were Random Forest Classifier, Decision Tree Classifier, Extra Trees Classifier, XGBClassifier, and Light Gradient Boosting Machine (LGBM) Classifier to determine the best estimator. The model was trained on an individual steam turbine using training data for two years, one year was used as validation and that year's data was used as test (holdout) data.

We evaluated the explanatory insights obtained after applying pipelines to analyze two critical failures for steam turbine 1 and steam turbine 3. These were handpicked for assessment due to their critical impact on the operational condition of the steam turbine. Engineer's assessment of the critical failure was also provided for validation.

In October, 2014, a mechanical vibration critical failure was observed for steam turbine 1. FIG. 4I captures the human visualization module of FIG. 4A for this failure. This allows the user (SME) to drill down (zoomed in view on the right side of FIG. 4I) and investigate a failure visually before looking at the output from the explainers. It can be clearly seen that the megawatt, thrust and journal bearing vibrations show an abnormal behavior between 4 to 6 pm on that day. The SME was also shown the output from the tag and component explainer pipelines. The SME wanted to look at the most similar notification captured by the component explainer for this critical failure to understand remediation actions done in the past. The component explainer could identify the correct component for this critical failure as valve based on the most similar past notification and delving further the SME observed that both the critical failure and the past similar notification were talking about such valves. This analysis by the SME helps in validating the component explainer pipeline which as mentioned earlier is a complete multi-modal pipeline. Overall, some embodiments of the present invention also observed that for steam turbine 2 out of 21 correctly predicted failures (True Positives) for 2016, where some embodiments of the present invention had 33 actual failures (P) and were able to identify the correct components for 12 of them using the component explainer.

In October 2014, a critical failure was observed for steam turbine 3. This can also be visualized using the human visualization module presented in FIG. 4I. The SME was presented with the output from the tag explainer for this critical failure. It was observed that the tag explainer could identify the exact tag (low pressure control valve) which was responsible for this critical failure as validated by the ground-truth. This helps in validating the tag explainer pipeline. Some embodiments of the present invention present an end-to-end real time anomaly detection system which can ingest data from different modalities such as time series, text and graphs to uncover explanatory insights. This is accomplished by (a) building a scalable and accurate anomaly detection model which relies on a custom-built domain semantic model (built uniquely for the steam turbine use case) and state-of-the-art pipeline paths evaluation to learn the best estimator, (b) a tag explainer which can use the black box anomaly detection model from (a) in conjunction with a local post-hoc explainability algorithm to learn the signature, and (c) a component explainer which can use the signatures from the tag explainer along with SME supervision and unstructured text analytics from the knowledge tool to obtain component level explanatory insights. We embed all these functionalities within a human visualization module for an end user (SME, data scientist or plant operator) to use.

There is scope for improvement in the unstructured text analytics part where we can extract features from the notification text using word embeddings that represent each word as a holistic, low-dimension vector, and aggregate such vectors to represent the whole notification. Some embodiments of the present invention can use domain specific word embedding (specific to Industry 4.0) to capture the context of the words in the notification from the domain perspective before doing downstream tasks such as classifying notifications to appropriate components. This can alleviate the burden of manually annotating all notifications for the SME also.

Figure 5:
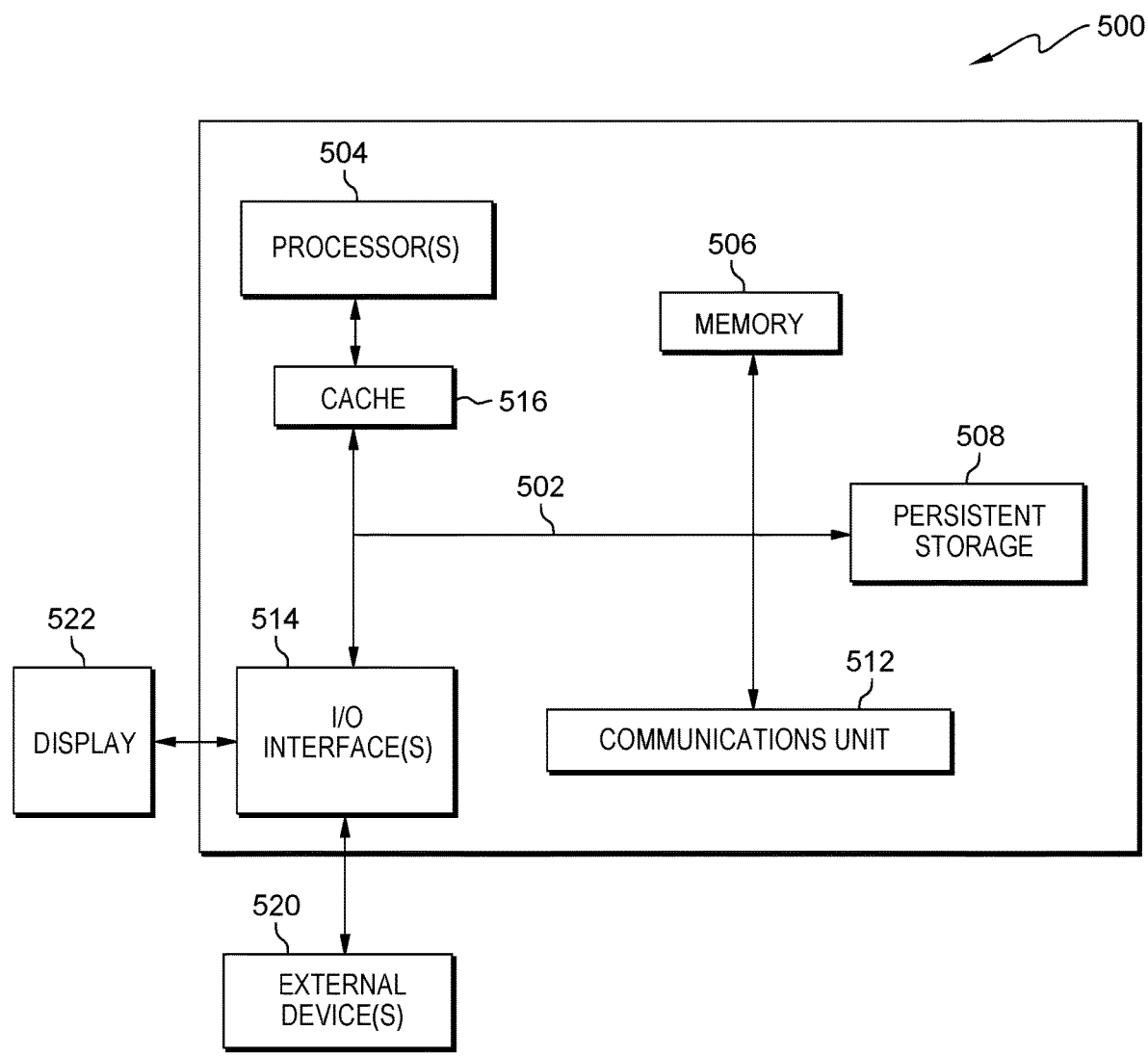
FIG. 5 depicts a block diagram of components of computing systems within a computing display environment of FIG. 1, in accordance with an embodiment of the present invention.

FIG. 5 depicts a block diagram of components of computing systems within a computing display environment 500 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer display environment 500 includes a communications fabric 502, which provides communications between a cache 516, a memory 506, a persistent storage 508, a communications unit 510, and an input/output (I/O) interface(s) 512. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses or a crossbar switch.

The memory 506 and the persistent storage 508 are computer readable storage media. In this embodiment, the memory 506 includes random access memory (RAM). In general, the memory 506 can include any suitable volatile or non-volatile computer readable storage media. The cache 516 is a fast memory that enhances the performance of the computer processor(s) 504 by holding recently accessed data, and data near accessed data, from the memory 506.

The program 104 may be stored in the persistent storage 508 and in the memory 506 for execution by one or more of the respective computer processors 504 via the cache 516. In an embodiment, the persistent storage 508 includes a magnetic hard disk drive. Alternatively, or in addition to a magnetic hard disk drive, the persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 508 may also be removable. For example, a removable hard drive may be used for the persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 includes one or more network interface cards. The communications unit 510 may provide communications through the use of either or both physical and wireless communications links. The program 104 may be downloaded to the persistent storage 508 through the communications unit 510.

The I/O interface(s) 512 allows for input and output of data with other devices that may be connected to a mobile device, an approval device, and/or the server computing device 108. For example, the I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 508 via the I/O interface(s) 512. The I/O interface(s) 512 also connect to a display 520.

The display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   ingesting tabular data from at least one modality of a plurality of modalities;
   simultaneously extracting data and generating a prediction model for a task of a computing device from the extracted data from at least two modalities in the plurality of modalities;
   generating a data signature based on the generated prediction model from the at least two modalities by leveraging the generated prediction model for ingested tabular data and extracted data;
   comparing the generated data signature to identified data signatures stored in at least one modality in the plurality of modalities to identify one or more shared data signatures which share a threshold number of features; and
   performing a task based on the generated data signature and a validation of the comparison of identified data signatures.

2. The computer-implemented method of claim 1, wherein ingesting tabular data comprises:
   analyzing a database of stored data features using artificial intelligence algorithms;
   identifying data features using machine learning algorithms; and
   learning temporal specific data features by combining the analysis of the stored data and the identified data features.

3. The computer-implemented method of claim 1, wherein ingesting tabular data comprises:
   analyzing at least one modality using artificial intelligence algorithms;
   identifying specific data features in relation to the analyzed modality using machine learning algorithms; and
   determining a sum, a skew, a kurtosis, a $25^{th}$ quantile, a $75^{th}$ quantile, and an interquartile range of tabular data by combining the analysis of the modality and the identified specific data features.

4. The computer-implemented method of claim 1, wherein generating a prediction model comprises:
   analyzing extracted data and pre-stored task predictions;
   generating a failure prediction analysis table by using a local post-hoc algorithm to rank, and organize task predictions based on type of failure and success of task;
   generating a model by applying a training set classifier on the generated failure prediction analysis table based on learned data signatures for specific failures and a validation set classifier on the generated failure prediction table to validate the learned data signatures.

5. The computer-implemented method of claim 1, wherein leveraging the generated prediction model comprises:
   analyzing extracted positive weighted coefficient and negative weighted coefficient;
   identifying a prediction of a task using the analysis of the positive weighted coefficients and shared negative weighted coefficients;
   calculating a prediction of failure based on a number of negative weighted coefficients exceeding a number of positive weighted coefficients; and
   validating a failure prediction based on the analysis of extracted coefficients, the identified prediction, and the prediction calculation.

6. The computer-implemented method of claim 1, wherein generating a data signature comprises:
   analyzing the generated prediction model;
   generating a baseline based on the analysis of the generated prediction model;
   training the generated prediction model to identify data signatures of a task based on the generated baseline;
   identifying pre-stored data signatures of the task from at least one modality; and
   selecting a shared data signature from the trained generated prediction model and the identified data signatures.

7. The computer-implemented method of claim 1, wherein comparing the generated data signatures comprises:
   receiving the generated data signatures from at least one modality;
   identifying data signatures for a past modality by using an explainer algorithm;
   determining shared features within the received data signatures and the identified data signatures; and
   generating a comparison of data signatures by calculating a number of shared features of the received data signatures and the identified data signatures.

8. The computer-implemented method of claim 1 further comprising measuring a performance improvement by calculating output differences between a performed task and a generated baseline associated with the performance of the task.

9. A computer program product comprising:
   one or more computer readable storage media and program instructions stored on the one or more computer readable storage media, the program instructions comprising:
   program instructions to ingest tabular data from at least one modality of a plurality of modalities;
   program instructions to simultaneously extract data and generate a prediction model for a task of a computing device from extracted data from at least two modalities in the plurality of modalities;
   program instructions to generate a data signature based on the generated prediction model from the at least two modalities by leveraging the generated prediction model for ingested tabular data and extracted data;
   program instructions to compare the generated data signature to identified data signatures stored in at least one modality in the plurality of modalities to identify one or more shared data signatures which share a threshold number of features; and
   program instructions to perform a task based on the generated data signature and a validation of the comparison of identified data signatures.

10. The computer program product of claim 9, wherein the program instructions to ingest tabular data comprise:
    program instructions to analyze a database of stored data features using artificial intelligence algorithms;
    program instructions to identify data features using machine learning algorithms; and
    program instructions to learn temporal specific data features by combining the analysis of the stored data and the identified data features.

11. The computer program product of claim 9, wherein the program instructions to ingest tabular data comprise:
    program instructions to analyze at least one modality using artificial intelligence algorithms;
    program instructions to identify specific data features in relation to the analyzed modality using machine learning algorithms; and
    program instructions to determine a sum, a skew, a kurtosis, a $25^{th}$ quantile, a $75^{th}$ quantile, and an interquartile range of tabular data by combining the analysis of the modality and the identified specific data features.

12. The computer program product of claim 9, wherein the program instructions to generate a prediction model comprise:
    program instructions to analyze extracted data and pre-stored task predictions;
    program instructions to generate a failure prediction analysis table by using a local post-hoc algorithm to rank, and organize task predictions based on type of failure and success of task;
    program instructions to generate a model by applying a training set classifier on the generated failure prediction analysis table based on learned data signatures for specific failures and a validation set classifier on the generated failure prediction table to validate the learned data signatures.

13. The computer program product of claim 9, wherein the program instructions to leverage the generated prediction model comprise:
    program instructions to analyze extracted positive weighted coefficient and negative weighted coefficient;
    program instructions to identify a prediction of a task using the analysis of the positive weighted coefficients and shared negative weighted coefficients;
    program instructions to calculate a prediction of failure based on a number of negative weighted coefficients exceeding a number of positive weighted coefficients; and
    program instructions to validate a failure prediction based on the analysis of extracted coefficients, the identified prediction, and the prediction calculation.

14. The computer program product of claim 9, wherein the program instructions to generate a data signature comprise:
    program instructions to analyze the generated prediction model;
    program instructions to generate a baseline based on the analysis of the generated prediction model;
    program instructions to train the generated prediction model to identify data signatures of a task based on the generated baseline;
    program instructions to identify pre-stored data signatures of the task from at least one modality; and
    program instructions to select a shared data signature from the trained generated prediction model and the identified data signatures.

15. A computer system comprising:
    one or more computer processors;
    one or more computer readable storage media; and
    program instructions stored on the one or more computer readable storage media for execution by at least one of the one or more processors, the program instructions comprising:
        program instructions to ingest tabular data from at least one modality of a plurality of modalities;
        program instructions to simultaneously extract data and generate a prediction model for a task of a computing device from extracted data from at least two modalities in the plurality of modalities;
        program instructions to generate a data signature based on the generated prediction model from the at least two modalities by leveraging the generated prediction model for ingested tabular data and extracted data;
        program instructions to compare the generated data signature to identified data signatures stored in at least one modality in the plurality of modalities to identify one or more shared data signatures which share a threshold number of features; and
        program instructions to perform a task based on the generated data signature and a validation of the comparison of identified data signatures.

16. The computer system of claim 15, wherein the program instructions to ingest tabular data comprise:
    program instructions to analyze a database of stored data features using artificial intelligence algorithms;
    program instructions to identify data features using machine learning algorithms; and
    program instructions to learn temporal specific data features by combining the analysis of the stored data and the identified data features.

17. The computer system of claim 15, wherein the program instructions to ingest tabular data comprise:
    program instructions to analyze at least one modality using artificial intelligence algorithms;
    program instructions to identify specific data features in relation to the analyzed modality using machine learning algorithms; and
    program instructions to determine a sum, a skew, a kurtosis, a $25^{th}$ quantile, a $75^{th}$ quantile, and an interquartile range of tabular data by combining the analysis of the modality and the identified specific data features.

18. The computer system of claim 15, wherein the program instructions to generate a prediction model comprise:
    program instructions to analyze extracted data and pre-stored task predictions;
    program instructions to generate a failure prediction analysis table by using a local post-hoc algorithm to rank, and organize task predictions based on type of failure and success of task;
    program instructions to generate a model by applying a training set classifier on the generated failure prediction analysis table based on learned data signatures for specific failures and a validation set classifier on the generated failure prediction table to validate the learned data signatures.

19. The computer system of claim 15, wherein the program instructions to leverage the generated prediction model comprise:
    program instructions to analyze extracted positive weighted coefficient and negative weighted coefficient;
    program instructions to identify a prediction of a task using the analysis of the positive weighted coefficients and shared negative weighted coefficients;
    program instructions to calculate a prediction of failure based on a number of negative weighted coefficients exceeding a number of positive weighted coefficients; and
    program instructions to validate a failure prediction based on the analysis of extracted coefficients, the identified prediction, and the prediction calculation.

20. The computer system of claim 15, wherein the program instructions to generate a data signature comprise:

program instructions to analyze the generated prediction model;
program instructions to generate a baseline based on the analysis of the generated prediction model;
program instructions to train the generated prediction model to identify data signatures of a task based on the generated baseline;
program instructions to identify pre-stored data signatures of the task from at least one modality; and
program instructions to select a shared data signature from the trained generated prediction model and the identified data signatures.

\* \* \* \* \*